United States Patent [19]

Kohayakawa

[11] Patent Number: 5,657,116
[45] Date of Patent: Aug. 12, 1997

[54] OCULAR LENS MEASURING APPARATUS

[75] Inventor: Yoshimi Kohayakawa, Yokohama, Japan

[73] Assignee: Canon Kabushiki Kaisha, Tokyo, Japan

[21] Appl. No.: 544,486

[22] Filed: Oct. 18, 1995

[30] Foreign Application Priority Data

Oct. 19, 1994 [JP] Japan .................. 6-279968

[51] Int. Cl.$^6$ .................................... G01B 9/00
[52] U.S. Cl. .................... 356/124; 356/328
[58] Field of Search .................. 356/124–127, 356/326, 328, 419, 239

[56] References Cited

U.S. PATENT DOCUMENTS

| | | | |
|---|---|---|---|
| 3,771,879 | 11/1973 | Chambu et al. | 356/124.5 |
| 4,125,328 | 11/1978 | Suga | 356/124 |
| 4,609,287 | 9/1986 | Kohayakawa . | |
| 4,826,315 | 5/1989 | Kohayakawa . | |
| 5,231,460 | 7/1993 | Kohayakawa . | |
| 5,339,151 | 8/1994 | Shinn | 356/124 |
| 5,489,978 | 2/1996 | Okumura et al. | 356/124 |

*Primary Examiner*—Hoa Q. Pham
*Attorney, Agent, or Firm*—Fitzpatrick, Cella, Harper & Scinto

[57] ABSTRACT

An apparatus for measuring the optical characteristics of an ocular lens includes a first measuring system for detecting light transmitted through the ocular lens and through a predetermined optical path for obtaining refractivity information of the ocular lens, and a second measuring system for detecting light transmitted through the ocular lens and through an optical path branching off from the predetermined optical path of the first measuring system and obtaining transmittance information of the ocular lens.

11 Claims, 2 Drawing Sheets

OCULAR LENS MEASURING APPARATUS

BACKGROUND OF THE INVENTION

1. Field of the Invention

This invention relates to an ocular lens measuring apparatus for use for the examination of glasses or the like in opticians' stores, ophthalmic hospitals, etc.

2. Related Background Art

The examination of glasses is usually carried out in ophthalmic hospitals and opticians' stores, but in an apparatus according to the prior art, a system for measuring the degree of correction of glasses and a system for measuring the transmittance of a lens are provided at discrete locations in the apparatus and during measurement, ocular lenses are set in the respective measuring systems to thereby effect measuring discretely.

In the above-described example of the prior art, however, the measurement of the degree of correction and the measurement of the transmittance of the glasses are performed in discrete measuring systems, and this leads to the problem that the entire apparatus becomes complicated in construction and the measuring operation becomes cumbersome and much measuring time is required.

SUMMARY OF THE INVENTION

In view of the above-described example of the prior art, the present invention has as its object the provision of an ocular lens measuring apparatus which can obtain refractivity information and light transmittance information by a simple construction and a simple operation.

Another object is to provide a simplified apparatus for measuring the spectral transmittance of a lens.

DETAILED DESCRIPTION OF THE PREFERRED EMBODIMENTS

Figure 1:
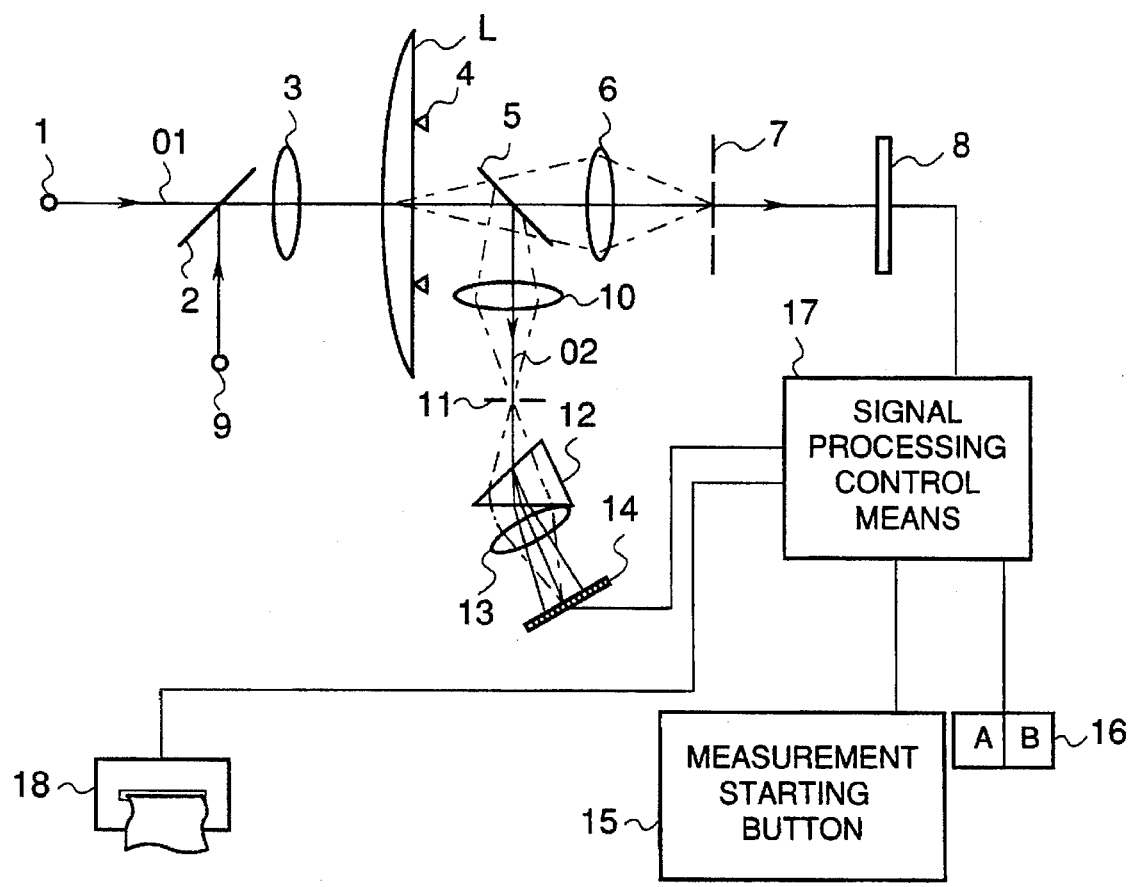
FIG. 1 shows the construction of a first embodiment of the present invention.

The present invention will hereinafter be described in detail with respect to some embodiments thereof shown in the drawings.

Referring to FIG. 1, which shows the construction of a first embodiment, on an optical path 01 from a lens refractivity measuring light source 1, such as an infrared LED, there are arranged in succession, a light dividing member 2 such as a dichroic mirror transmitting infrared light therethrough, a lens 3, a lens L to be examined contacted by a contacting member 4, a dichroic mirror 5 transmitting infrared light therethrough, a lens 6, a four-aperture stop 7 conjugate with the surface of the lens L to be examined, and a photoelectric sensor 8 such as a two-dimensional charge coupled device (CCD). In the direction of incidence of the light dividing member 2, there is disposed a lens transmittance measuring light source 9 such as a xenon lamp including near ultraviolet light, and on an optical path 02 in the direction of reflection of the dichroic mirror 5, there are arranged in succession a lens 10, a slit stop 11 conjugate with the lens L to be examined, a spectrally diverging prism (spectral prism) 12, a lens 13 and a one-dimensional CCD 14 provided conjugately with the lens L to be examined and the stop 11.

A material transmitting ultraviolet light therethrough is used for the lenses 3, 10 and 13. Also, not lenses but concave mirrors may be used. Further, a diffraction grating or the like may be used instead of the spectral prism 12. If use is made of a xenon lamp emitting ultraviolet light and visible light, this xenon lamp can serve also as the light sources 1 and 9.

The outputs of the photoelectric sensor 8, the one-dimensional CCD 14, a measurement starting button 15 and a measurement item selecting button 16 for selecting measurement items, i.e., refractivity A and transmittance B, are connected to signal processing control means 17, the output of which is in turn connected to a printer 18.

When the button A of the measurement item selecting button 16 is selected and the measurement starting button 15 is depressed, the lens refractivity measuring light source 1 emits light, and a light beam from the light source 1 passes through the light dividing member 2 and the lens 3 and further passes through the lens L to be examined, the dichroic mirror 5, the lens 6 and the stop 7 conjugate with the lens L and having four openings around the optical path 01, and four light beams are received by the photoelectric sensor 8 such as a two-dimensional CCD. The signals of this sensor are processed by the signal processing control means 17 and the refractivity number of the lens L to be examined is calculated from the two-dimensional positions of the four light beams. The specific measurement principle is well known and therefore need not be described herein.

On the other hand, when the button B of the measurement item selecting button 16 is selected and the measurement starting button 15 is depressed, the lens transmittance measuring light source 9 emits light, and ultraviolet light from the light source 9 is reflected by the dichroic mirror 5 when it is transmitted through the lens L, and passes through the lens 10, the slit stop 11 conjugate with the lens L, the spectral prism 12 and the lens 13 and is received by the one-dimensional CCD 14 conjugate with the stop 11. Due to the action of the spectral prism, the light transmitted through the lens L differs in its incidence position on the one-dimensional CCD 14 for each wavelength. The signal from this one-dimensional CCD 14 is processed by the signal processing control means 17, and the spectral transmittance of the lens L to be examined is obtained from the detected quantity of light of each pixel of the one-dimensional CCD 14 made in advance to correspond to the wavelength of incident light.

As described above, when the button A of the measurement item selecting button 16 is depressed, the refractivity of the lens L is found, and when the button B is depressed, the transmittance of the lens L is found, and when the buttons A and B are depressed, the refractivity and the transmittance are measured at a time, and those results are displayed on the printer 18.

Figure 2:
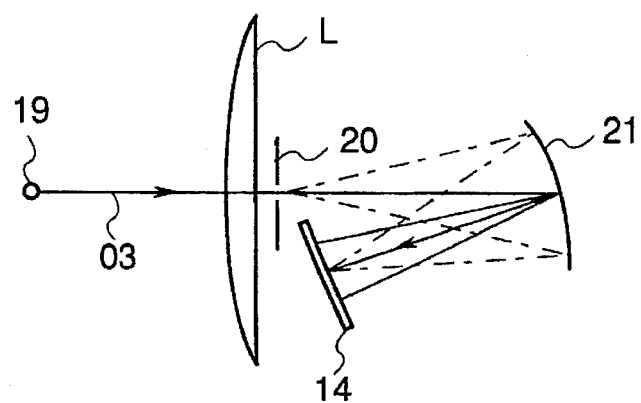
FIG. 2 shows the construction of a second embodiment of the present invention.

Referring now to FIG. 2 which shows the construction of a second embodiment, the refractivity measuring system for the lens L to be examined and the signal processing control system subsequent to the CCD 14 are similar to those in FIG. 1. Also, the dichroic mirror 5 disposed between the lens L and concave mirror 21 is omitted. The lens L to be examined is disposed on the optical path 03 of a light source 19 comprising a xenon lamp including ultraviolet light, a stop 20 having a fine slit in the spectrally diverging direction thereof is provided near the lens L to be examined, and a concave mirror 21 formed with a diffraction grating is disposed obliquely to the optical path 03 on the extension thereof. In the direction of reflection of the concave mirror 21, a one-dimensional CCD 14 is disposed at a position conjugate with the stop 20 with respect to the concave mirror 21.

A light beam from the light source 19 passes to the lens L to be examined, and the light transmitted through the lens L to be examined and the stop 20 is reflected by the concave mirror 21, is separated by the diffraction grating on the concave mirror 21 and is received by the one-dimensional CCD 14, and the spectral transmittance of the light is measured from the light distribution by each element of the diffraction grating. Since the stop 20 and the one-dimensional CCD 14 are disposed conjugately with each other with respect to the concave mirror 21, the light beam is projected at a fixed quantity onto the one-dimensional CCD 14, irrespective of the divergence or convergence of the light beam by the lens L to be examined and thus, the transmittance can be measured in terms of an absolute value.

Figure 3:
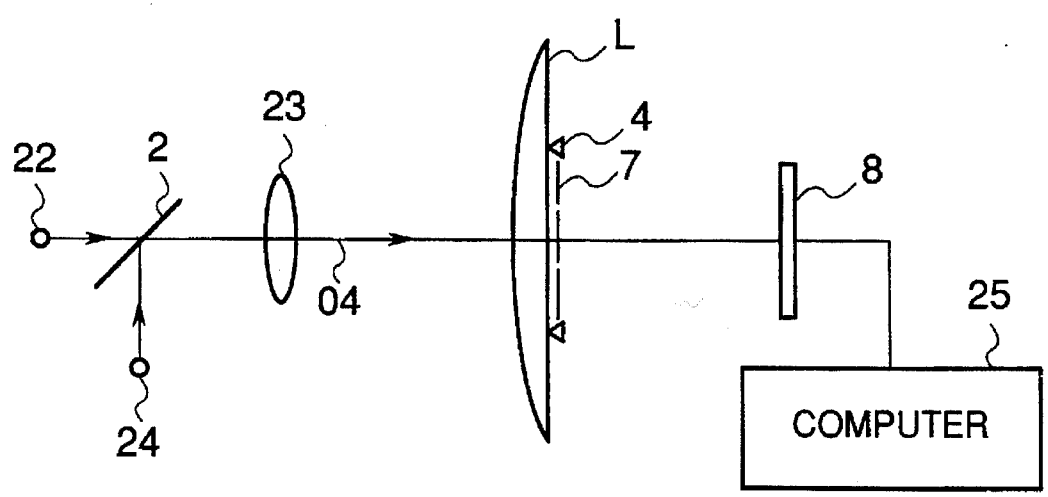
FIG. 3 shows the construction of a third embodiment of the present invention.

FIG. 3 shows the construction of a third embodiment. In this embodiment, in addition to refractivity, the ultraviolet light cutting rate can be measured. On the optical path 04 of a refractivity measuring light source 22 such as an LED, there are arranged in succession a dichroic mirror 2, a lens 23, a lens L to be examined contacted by a contacting member 4, a four-aperture stop 7 and a two-dimensional CCD 8, and in the direction of incidence of the dichroic mirror 2, there is disposed a light source 24 which emits ultraviolet light of a wavelength of the order of 320–400 nm. The output of the two-dimensional CCD 8 is connected to a computer 25.

A light beam from the light source 22 passes through the dichroic mirror 2 and the lens 23 and is received by the two-dimensional CCD 8 via the lens L to be examined and the four-aperture stop 7. Four light beams having passed through the four-aperture stop 7 have their positions calculated by the computer 25, whereby the refractivity of the lens L to be examined is calculated.

The ultraviolet light from the light source 24 is reflected by the dichroic mirror 2, passes through the lens L to be examined and is received by the two-dimensional CCD 8. This quantity of light is calculated and the ultraviolet light cutting rate of the lens n to be examined is displayed in e.g. %. The quantity of light in a state in which the ultraviolet light cutting rate is 0 is found in advance from the output of the two-dimensional CCD 8 in a state in which the lens L is absent. The light beam from the light source 24 diverges or converges depending on the refractive power of the lens L to be examined, but all light beams having passed through the four-aperture stop 7 are received by the two-dimensional CCD 8 and therefore, the quantity of light transmitted through the lens L to be examined is measured accurately. When a one-dimensional CCD is used as the light receiving sensor, the quantity of light received differs in some cases depending on the refractive power of the lens L to be examined, but if the refractive power is measured in advance and the quantity of light received is corrected by the use of the value thereof, the exact transmittance of the lens L can be found.

Further, if a visible light source is used as the refractivity measuring light source 22 and the transmittance of visible light is found on the basis of the quantity of light received by the two-dimensional CCD 8 as in the above-described case of ultraviolet light when the refractive power of the lens L to be examined is to be measured, the light transmittance of sunglasses or the like can be measured.

According to the above-described ocular lens measuring apparatus, the refractivity and transmittance of the lens to be examined can both be measured at the same position. Also, the transmittance of the lens to be examined can be accurately measured irrespective of the refractivity of the lens to be examined.

What is claimed is:

1. An apparatus for measuring the optical characteristics of an ocular lens comprising:

a first measuring system for detecting light transmitted through the ocular lens and through a predetermined optical path for obtaining refractivity information of the ocular lens; and a second measuring system for detecting light transmitted through the ocular lens and through a branching-off optical path branching off from the predetermined optical path of said first measuring system and for obtaining transmittance information of the ocular lens.

2. The apparatus according to claim 1, wherein said second measuring system has a prism on the branching-off optical path.

3. The apparatus according to claim 1, wherein said first measuring system and said second measuring system have discrete light sources for measurement.

4. The apparatus according to claim 3, wherein the light source for said second measuring system emits near ultraviolet light.

5. The apparatus according to claim 1, wherein said predetermined optical path and said branching-off optical path are separated from each other by a dichroic mirror.

6. The apparatus according to claim 1, wherein said second measuring system has a concave mirror formed with a diffraction grating.

7. The apparatus according to claim 1, wherein said second measuring system has a stop facing the ocular lens, and a photoelectric element disposed conjugately with said stop.

8. An apparatus for measuring the optical characteristics of an ocular lens comprising:

a first measuring system for detecting light transmitted through the ocular lens with a photoelectric element and for obtaining refractivity information of the ocular lens; and a second measuring system for detecting the light transmitted through the ocular lens with said photoelectric element and obtaining transmittance information of the ocular lens.

9. The apparatus according to claim 8, wherein said second measuring system measures the ultraviolet wavelength light cutting rate of the ocular lens as the transmittance information of said ocular lens.

10. An apparatus for measuring the optical characteristics of an ocular lens comprising:

a first measuring system for detecting light transmitted through the ocular lens and for obtaining refractivity information of the ocular lens; and a second measuring system for detecting light transmitted through the ocular lens and for obtaining light transmittance information of the ocular lens, wherein said second measuring system detects light at a position approximately conjugate with the ocular lens.

11. An apparatus for measuring the optical characteristics of an ocular lens comprising:

a first measuring system for detecting light transmitted through the ocular lens and through a predetermined optical path for obtaining refractivity information of the ocular lens; and a second measuring system for detecting light transmitted through the ocular lens via at least a portion of the predetermined optical path of said first measuring system and for measuring the light transmittance of the ocular lens.

* * * * *